US010769306B2

(12) United States Patent
Antonatos et al.

(10) Patent No.: US 10,769,306 B2
(45) Date of Patent: Sep. 8, 2020

(54) APPLYING A DIFFERENTIAL PRIVACY OPERATION ON A CLUSTER OF DATA

(71) Applicant: INTERNATIONAL BUSINESS MACHINES CORPORATION, Armonk, NY (US)

(72) Inventors: Spyridon Antonatos, Dublin (IE); Stefano Braghin, Blanchardstown (IE); Naoise Holohan, Dublin (IE); Pol Mac Aonghusa, Carbury (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 15/710,917

(22) Filed: Sep. 21, 2017

(65) Prior Publication Data

US 2019/0087604 A1 Mar. 21, 2019

(51) Int. Cl.
  *G06F 21/62* (2013.01)
  *G06F 16/28* (2019.01)
  *G06F 21/32* (2013.01)

(52) U.S. Cl.
  CPC ........ *G06F 21/6254* (2013.01); *G06F 16/285* (2019.01); *G06F 21/32* (2013.01); *G06F 21/6245* (2013.01); *G06F 21/6227* (2013.01)

(58) Field of Classification Search
  CPC ............. G06F 21/6245; G06F 21/6254; G06F 21/6227; G06F 21/32
  See application file for complete search history.

(56) References Cited

U.S. PATENT DOCUMENTS

| 8,447,738 | B1* | 5/2013 | Binkowski | G06F 19/326 |
| | | | | 707/688 |
| 9,202,081 | B2* | 12/2015 | Huang | G06F 21/6245 |
| 9,563,689 | B1* | 2/2017 | Pueyo | G06F 16/35 |
| 9,785,705 | B1* | 10/2017 | Cartright | G06F 16/35 |
| 9,916,472 | B2* | 3/2018 | Heckel | G06F 21/6245 |
| 10,216,837 | B1* | 2/2019 | Saikia | G06N 5/003 |
| 10,296,761 | B2* | 5/2019 | Jebara | G06F 21/6245 |
| 10,423,781 | B2* | 9/2019 | Beskorovajnov | G06F 21/552 |
| 2002/0147766 | A1* | 10/2002 | Vanska | H04L 63/12 |
| | | | | 709/203 |
| 2002/0169793 | A1* | 11/2002 | Sweeney | G06F 21/6245 |
| 2008/0082566 | A1* | 4/2008 | Aggarwal | G06F 21/6245 |
| 2011/0225200 | A1* | 9/2011 | Danis | G06Q 10/10 |
| | | | | 707/783 |

(Continued)

FOREIGN PATENT DOCUMENTS

| CN | 104135362 A | 11/2014 |
| CN | 106778314 A | 5/2017 |

OTHER PUBLICATIONS

Soria-Comas, Jordi, et al. "Enhancing data utility in differential privacy via microaggregation-based k-anonymity." The VLDB Journal 23.5 (2014): 771-794. (Year: 2014).*
T. Zhu, G. Li, Y. Ren, W. Zhou and P. Xiong, "Privacy Preserving for Tagging Recommender Systems," 2013 IEEE/WIC/ACM International Joint Conferences on Web Intelligence (WI) and Intelligent Agent Technologies (IAT), Atlanta, GA, 2013, pp. 81-88. (Year: 2013).*

(Continued)

*Primary Examiner* — Kari L Schmidt
(74) *Attorney, Agent, or Firm* — Griffiths & Seaton PLLC

(57) ABSTRACT

Embodiments for data anonymity by a processor. A dataset may be transformed into an anonymous dataset by applying a differential privacy operation and a clustering operation to the dataset.

12 Claims, 7 Drawing Sheets

(56) References Cited

U.S. PATENT DOCUMENTS

| | | | | |
|---|---|---|---|---|
| 2012/0191714 | A1* | 7/2012 | Datar | G06F 16/9535 707/737 |
| 2013/0198188 | A1* | 8/2013 | Huang | G06F 21/6254 707/737 |
| 2013/0198194 | A1* | 8/2013 | Chen | G06F 21/6254 707/740 |
| 2013/0339359 | A1* | 12/2013 | Goyal | G06F 16/2228 707/737 |
| 2014/0172854 | A1* | 6/2014 | Huang | G06F 21/6245 707/737 |
| 2014/0196151 | A1* | 7/2014 | Mishra | G06F 16/258 726/26 |
| 2015/0135329 | A1* | 5/2015 | Aghasaryan | H04L 67/306 726/26 |
| 2015/0161229 | A1* | 6/2015 | Davies | G06F 16/285 707/737 |
| 2016/0071170 | A1* | 3/2016 | Massoulie | G06Q 30/0282 705/26.7 |
| 2016/0224803 | A1* | 8/2016 | Frank | G06F 21/6245 |
| 2016/0292455 | A1* | 10/2016 | Jebara | G06F 21/6245 |
| 2017/0024575 | A1* | 1/2017 | Heckel | G06F 21/6245 |
| 2017/0124152 | A1* | 5/2017 | Nerurkar | G06N 5/003 |
| 2017/0293772 | A1* | 10/2017 | Chen | G06Q 50/01 |
| 2018/0004978 | A1* | 1/2018 | Hebert | G06F 16/2457 |
| 2018/0096166 | A1* | 4/2018 | Rogers | H04W 12/02 |
| 2018/0173894 | A1* | 6/2018 | Boehler | G06F 21/6254 |
| 2018/0181878 | A1* | 6/2018 | Kasiviswanathan | G06N 20/00 |
| 2018/0330105 | A1* | 11/2018 | Nishitani | G06F 1/187 |
| 2018/0349638 | A1* | 12/2018 | Barraclough | H04L 63/0428 |
| 2019/0244138 | A1* | 8/2019 | Bhowmick | H04L 9/008 |
| 2019/0260784 | A1* | 8/2019 | Stockdale | G06N 20/10 |
| 2019/0332963 | A1* | 10/2019 | Wong | G06N 20/00 |
| 2019/0347278 | A1* | 11/2019 | Park | G06F 16/2465 |
| 2019/0370497 | A1* | 12/2019 | Gkoulalas-Divanis | G06K 9/6232 |
| 2020/0034566 | A1* | 1/2020 | Zhang | G06Q 50/01 |

OTHER PUBLICATIONS

Inan, Ali, et al. "Private record matching using differential privacy." Proceedings of the 13th International Conference on Extending Database Technology. 2010. pp. 123-134. (Year: 2010).*

Qu, Youyang, Jiyang Xu, and Shui Yu. "Privacy preserving in big data sets through multiple shuffle." Proceedings of the Australasian Computer Science Week Multiconference. 2017. pp. 1-8. (Year: 2017).*

Kavitha S, Yamini S and Raja Vadhana P, "An evaluation on big data generalization using k-Anonymity algorithm on cloud," 2015 IEEE 9th International Conference on Intelligent Systems and Control (ISCO), Coimbatore, 2015, pp. 1-5. (Year: 2015).*

L. Li-Xin, D. Yong-Shan and W. Jia-Yan, "Differential Privacy Data Protection Method Based on Clustering," 2017 International Conference on Cyber-Enabled Distributed Computing and Knowledge Discovery (CyberC), Nanjing, 2017, pp. 11-16. (Year: 2017).*

Mulle et al., "Privacy-Integrated Graph Clustering Through Differential Privacy," Workshop Proceedings of the EDBT/ICDT 2015 Joint Conference, Mar. 27, 2015 (8 pages).

Kodeswaran et al., "Applying Differential Privacy to Search Queries in a Policy Based Interactive Framework," PAVLAD'09, ACM, Nov. 6, 2009 (8 pages).

Anonymous, "A method uses dynamic anonymization to protect customer sensitive data during analytics," An IP.com Prior Art Database Technical Disclosure, IP.com No. IPCOM000249015D, Jan. 26, 2017 (7 pages).

Anonymous, "A method for the generation of large synthetic test datasets based on cluster models, and using database views as the generation mechanism," An IP.com Prior Art Database Technical Disclosure, IP.com No. IPCOM000238143D, Aug. 5, 2014 (4 pages).

IBM, "Method for real-time generation of approximate overview of massive datasets and generating user-specified detailed local views," An IP.com Prior Art Database Technical Disclosure, IP.com No. IPCOM000166782D, Jan. 23, 2008 (9 pages).

* cited by examiner

APPLYING A DIFFERENTIAL PRIVACY OPERATION ON A CLUSTER OF DATA

BACKGROUND OF THE INVENTION

Field of the Invention

The present invention relates in general to computing systems, and more particularly to, various embodiments for applying differential privacy on clustered data by a processor.

Description of the Related Art

In today's society, consumers, businesspersons, educators, and others communicate over a wide variety of mediums in real time, across great distances, and many times without boundaries or borders. Processing devices, with the advent and further miniaturization of integrated circuits, have made it possible to be integrated into a wide variety of personal, business, health, home, education, entertainment, travel and other devices. Accordingly, the use of computers, network appliances, and similar data processing devices continue to proliferate throughout society.

SUMMARY OF THE INVENTION

Various embodiments for enhancing data anonymity by applying differential privacy on clustered data of a user by a processor, are provided. In one embodiment, by way of example only, a method for applying differential privacy on clustered data, again by a processor, is provided. A dataset may be transformed into an anonymous dataset by applying a differential privacy operation and a clustering operation to the dataset.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
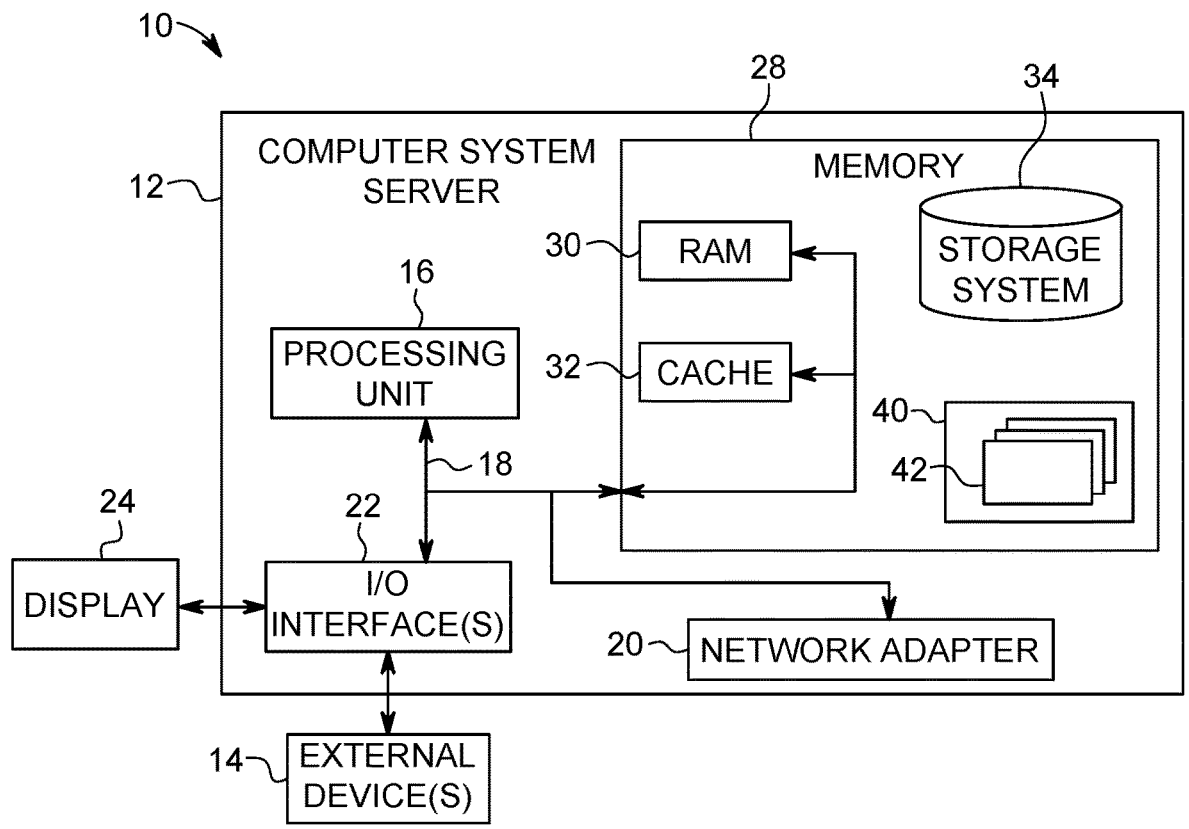
FIG. 1 is a block diagram depicting an exemplary cloud computing node according to an embodiment of the present invention.

Preserving privacy in a computer system has been an important consideration in recent years because of many new kinds of technology that facilitate the collection of different kinds of data. Such large collections of data have lead increasingly to a need to develop methods for protecting the privacy of underlying data records. For example, databases containing records of clients at a hospital may include references to the names of clients, their particular medical histories, and other details such as the age, height, weight, etc. Another example of a database containing sensitive data requiring privacy would be a database at a bank including customers' names, account numbers, and transaction histories.

To preserve privacy, record-level data must be anonymized so that no individual can be identified from the data. One metric for anonymization is known as k-anonymity. K-anonymity requires that each record is the same as at least k−1 other records with respect to certain identifying attributes. One method for achieving k-anonymity, known as generalization, involves replacing values for identifying attributes by more general values to achieve k-anonymity. A primary motivation behind the k-anonymity approach is that public databases can often be used by individuals to identify personal information about users. For example, a person's age and zip code can be used for identification to a very high degree of accuracy. Therefore, the k-anonymity method attempts to reduce the granularity of representation of the data in order to minimize the risk of disclosure. Some advanced anonymization algorithms for attaining k-anonymity include approximation algorithms to achieve k-anonymity, optimal k-anonymity, privacy enhancing k-anonymity in distributed scenarios, personalized privacy preservation, and multi-dimensional k-anonymity. However, existing k-anonymity algorithms fail to achieve k-anonymization for simultaneously processing or "handling" categorical and numerical attributes of a dataset.

Thus, a need exits for achieving k-anonymization by simultaneously processing or "handling" categorical and numerical attributes of a dataset without requiring over-generalization. A need also exists to produce generalizations of numerical attributes, meaning only a single value can be associated with each equivalence class (either a returned number or a mid-point of a range) because it is impossible to learn about the distribution of values in an equivalence class, leading to potentially greater information loss.

Thus, as described herein, the present disclosure provides for a system to implement a differential privacy on clustered data that allows for the flexible preservation of information while maintaining rigorous mathematical guarantees of privacy. In one aspect, data anonymity is achieved on clustered data (e.g., k-anonymity), while providing information-loss measurements. In one aspect, a differential privacy may be applied on individual data points or datasets as distinct from statistics on the data. The differential privacy may be applied to any data source with both categorical and numerical attributes such as, for example, healthcare data, which includes categorical attributes (e.g., place of birth, race, gender) and numerical attributes (e.g., measurements such as height or weight). Thus, the application of differential privacy on clustered data ensures privacy by rendering different values statistically indistinguishable.

In one aspect, various embodiments described herein provide anonymity to user-provided datasets by applying a clustering algorithm and, subsequently, a differential privacy to the clustered dataset. In one aspect, one or more users may define the dataset and a clustering operation to be applied to the dataset. The one or more users may define a set of attributes of the dataset that are to be used by the clustering operation. The one or more users may define a set of attributes on which to apply differential privacy. Additionally, one or more users may specify the level of privacy required by means of the specification of one or more parameters of the differential privacy operation (e.g., epsilon ("ε")-delta ("δ")-differential privacy).

It should be noted that the differential privacy operation provides means to maximize the accuracy of queries from databases (e.g., statistical databases) while minimizing chances of identifying the records of the database.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
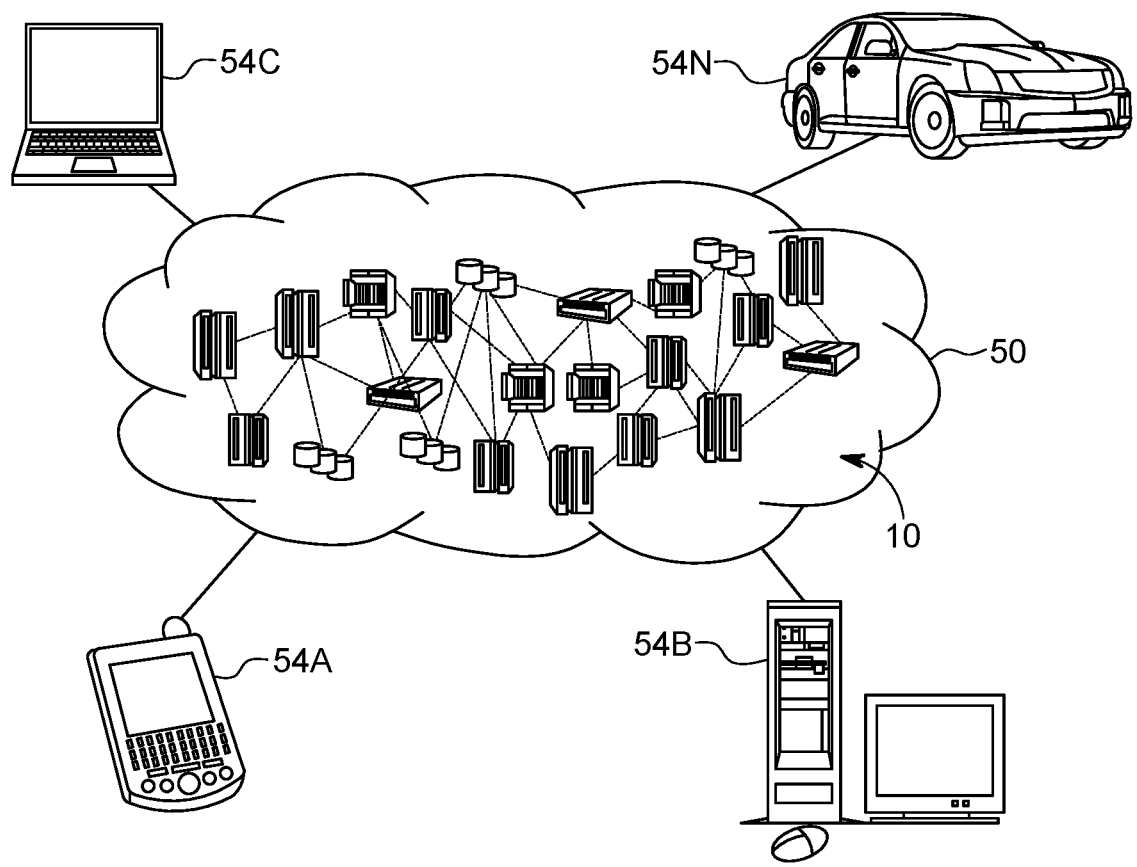
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
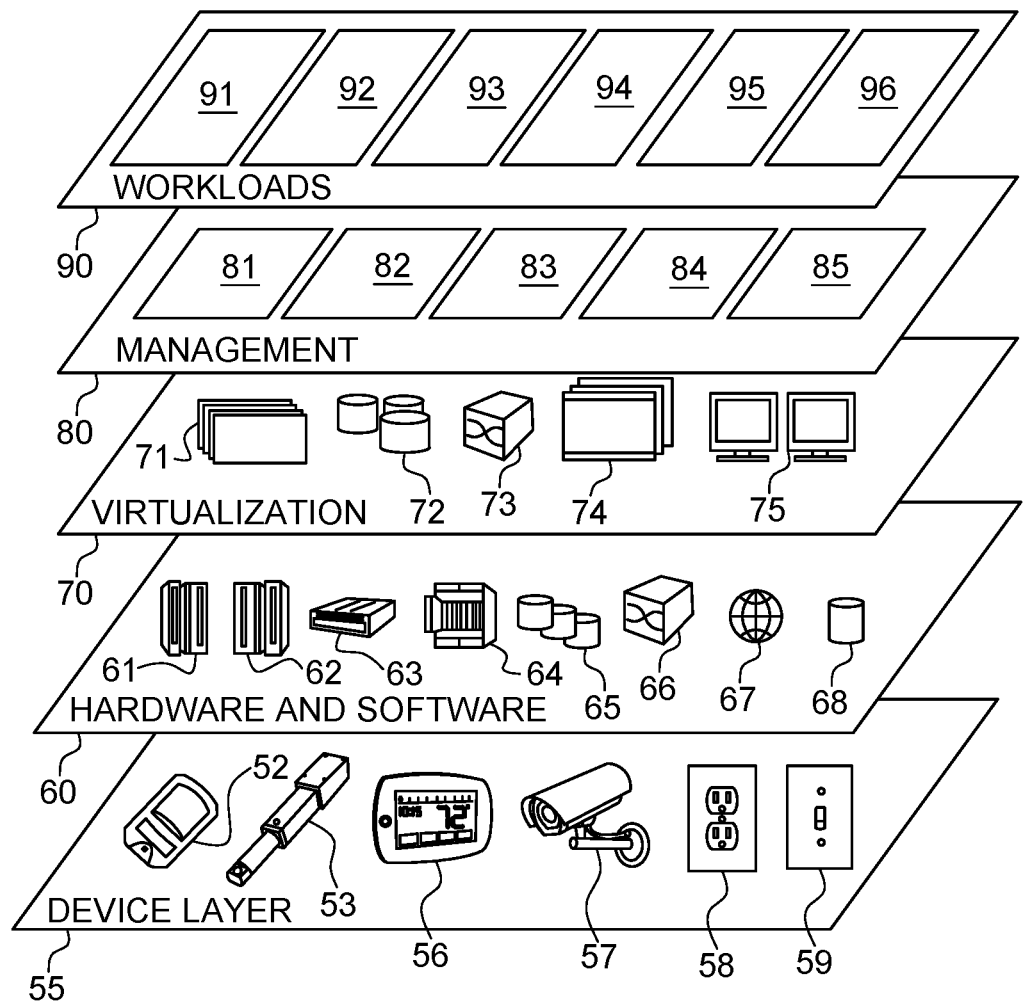
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various differential privacy and clustering operation workloads and functions 96. In addition, differential privacy and clustering operation workloads and functions 96 may include such operations as data analytics, data analysis, and as will be further described, notification functionality. One of ordinary skill in the art will appreciate that the differential privacy and clustering operation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for applying differential privacy on clustered data, again by a processor. A dataset may be transformed into an anonymous dataset by applying a differential privacy operation and a clustering operation to the dataset.

Figure 4:
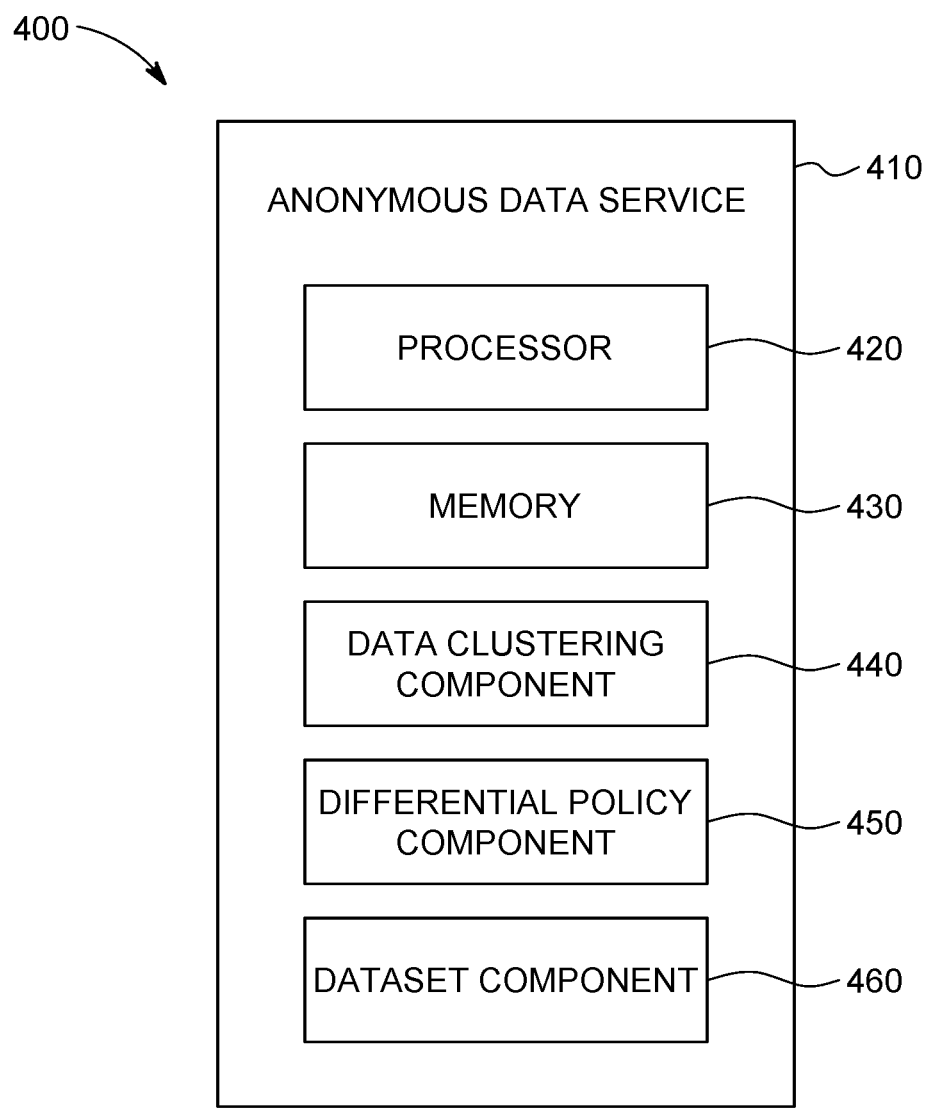
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, one or more of the components, modules, services, applications, and/or functions described in FIGS. 1-3 may be used in FIG. 4. An anonymous data service 410 is shown, incorporating processing unit 420 to perform various computational, data processing and other functionality in accordance with various aspects of the present invention. The processing unit 420 may be in communication with memory 430. The anonymous data service 410 may include a data clustering component 440, a differential policy component 450, and a dataset component 460. As one of ordinary skill in the art will appreciate, the depiction of the various functional units in anonymous data service 410 is for purposes of illustration, as the functional units may be located within an anonymous data service 410 or elsewhere within and/or between distributed computing components.

The dataset component 460 may include a data repository or database (e.g., a statistical database) accessible by the anonymous data service 410. The dataset component 460 may work in concert with processing unit 420 and memory 430 to accomplish various aspects of the present invention, such as, for example, enabling one or more datasets, fields of the datasets, or a cluster of datasets of one or more databases to be defined.

The dataset component 460 may define the dataset and a clustering operation to be applied via the data clustering component 440 to the dataset. A set of attributes of the dataset that may be used by the clustering operation may also be defined using the dataset component 460. A set of attributes on which to apply differential privacy may also be defined using the dataset component 460. Additionally, a level of privacy required by means of the specification of one or more parameters of the differential privacy operation may also be defined using the dataset component 460.

The data clustering component 440 and differential policy component 450 may each work in concert with processing unit 420 and memory 430 to accomplish various aspects of the present invention. For example, data clustering component 440 and differential policy component 450 may undergo various data analytics functions associated with the dataset component 460. As one of ordinary skill in the art will appreciate, the dataset component 460, the data clustering component 440, and the differential policy component 450 may implement mathematical modeling, probability and statistical analysis or modeling, probabilistic logic, text data compression, data clustering, differential privacy operations or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

More specifically, the data clustering component 440 may apply a clustering algorithm to user defined data points or datasets. Subsequently, the differential policy component 450 may apply a differential privacy operation to the clustered dataset, which is a result of the clustering operation.

Figure 5:
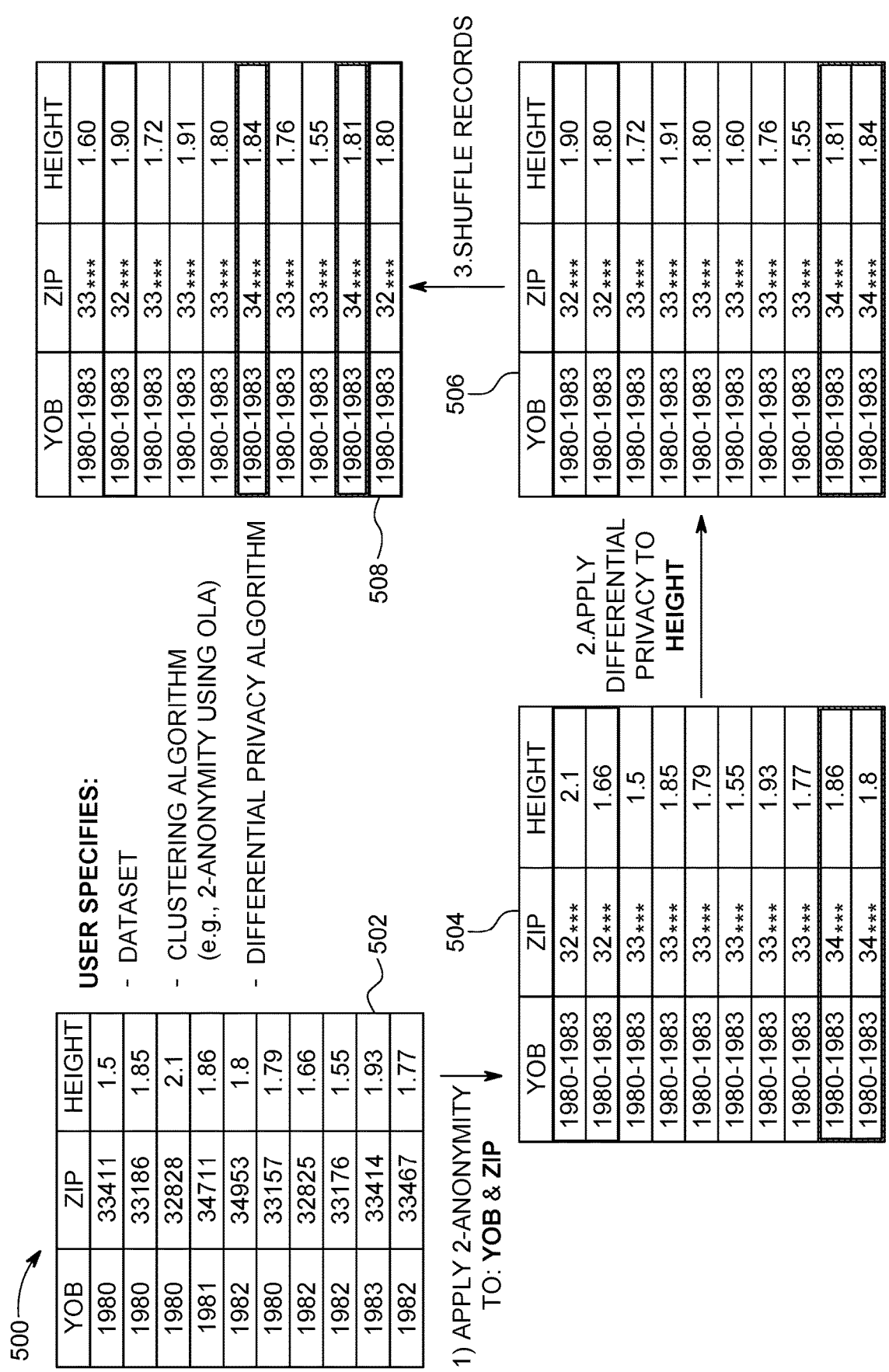
FIG. 5 is a block/flow diagram illustrating certain aspects of functionality according to the present invention.

In view of the method 400 of FIG. 4, consider, as an illustration of exemplary functional blocks to accomplish various purposes of the present invention, FIG. 5, following. FIG. 5 illustrates these exemplary functional blocks 500. Each of the functional blocks 500 may be implemented in hardware and/or software, such as by the computer/server 12 (FIG. 1), and/or the workloads layer 90 (FIG. 3).

In the depicted embodiment, a dataset 502 may be stored in a database containing various information such as year of birth ("YOB"), zip code ("ZIP"), and height data. As one of ordinary skill in the art will appreciate, the various dataset 502 may be obtained from a wide variety of sources and databases. Accordingly, in a first step, a dataset and a cluster operation ("CF") may be defined by a user such as, for example, the YOB and the ZIP. The clustering operation may be a 2-anonymity operation using optimal lattice anonymization "OLA". A user may also define the differential privacy operation (e.g., epsilon ("ε")-delta ("δ")-differential privacy).

In operation, the following steps of operation may occur. In step 1, the clustering operation may be applied to the YOB field and the ZIP fields of dataset 504. In step 2, the differential privacy operation may be applied to an alternative field of the dataset such as, for example, the height field of dataset 506. In other words, the clustering operation is performed on a first set of data or fields of data and then the differential privacy operation is applied to a second set of data or fields of data. In step 3, the records may be shuffled as illustrated in dataset 508.

In view of the foregoing blocks of functionality 500, consider the following mathematical workflow of enhancing data anonymity by applying differential privacy on clustered data. In one aspect, the user input includes a dataset "D" with "n" number of records (e.g., $D=\{d_1, d_2, \ldots, d_n\}$) and "m" number of fields "F" (e.g., $F(D)=\{F_1, F_2, \ldots, F_n\}$), where n and m are positive integers or a selected variable. The clustering operation ("Clus") may be a user specified clustering operation such as, for example, as defined in equation 1:

$$\text{Clus: } D \times CF \rightarrow \{D'_1, D'_2, \ldots D'_g\} \quad (1)$$

where $D'_i$ is a number of the clustered datasets that the clustering operation ("Clus") creates such as, for example, $D'_1, D'_2, \ldots D'_g$. The user input may also include the defined epsilon ("ε")-delta ("δ")-differential privacy operation such as, for example, as defined in equation 2:

$$\text{Diff}_{\in,\delta}: D'_i \times DF \rightarrow D''_i \quad (2),$$

where $D''_i$ are each of the individual datasets that the differential privacy operation is performed upon (e.g., differential privacy clusters). The user may also define the set of fields (e.g., "DF") for applying the differential privacy operation such as, for example, as defined in equation 3:

$$DF \subseteq F(D) \quad (3).$$

The user may also define the set of fields (e.g., "CF") for applying the clustering operation ("Clus") such as, for example, as defined in equation 4:

$$CF \subseteq F(D) \quad (4)$$

which may be optional. If the user does not specify or define the set of fields for applying the clustering operation ("Clus"), the set of fields for applying the clustering operation ("Clus") are defined in equation 5:

$$CF = F(D)/DF \quad (5).$$

Accordingly, a dataset "D" may be clustered by applying the clustering operation ("Clus") to the set of fields "CF" which may yield or result in "g" clusters, where g is a positive integer or a selected variable. The differential privacy operation Dif $f_{\in,\delta}$ may be applied to each number of the clustered datasets $D'_i$ which may yield or result in differential privacy clusters D". The clusters D" may be merged into an enhanced anonymous dataset (D''') which may be shuffled and changed.

In view of the foregoing functionality, consider the following pseudocode.

---

1. If Clus has been specified:
    1. $\{D_1', D_2', \ldots D_g'\}$ = Clus(D,CF)
2. Else:
    1. $\{D_1', D_2', \ldots D_g'\}$ = partition D according to the values of field CF
3. For each $D_i' \in \{D_1', D_2', \ldots D_n'\}$ :
    1. Optional: Generalize $D_i'$ over the fields CF
    2. $D_i''$ = $\text{Diff}_{\in,\delta}$ ($D_i'$, DF)
4. D''' = shuffle(concatenate($D_1''$, $D_2''$, ... , $D_n''$))
5. Return D'''

---

Figure 6:
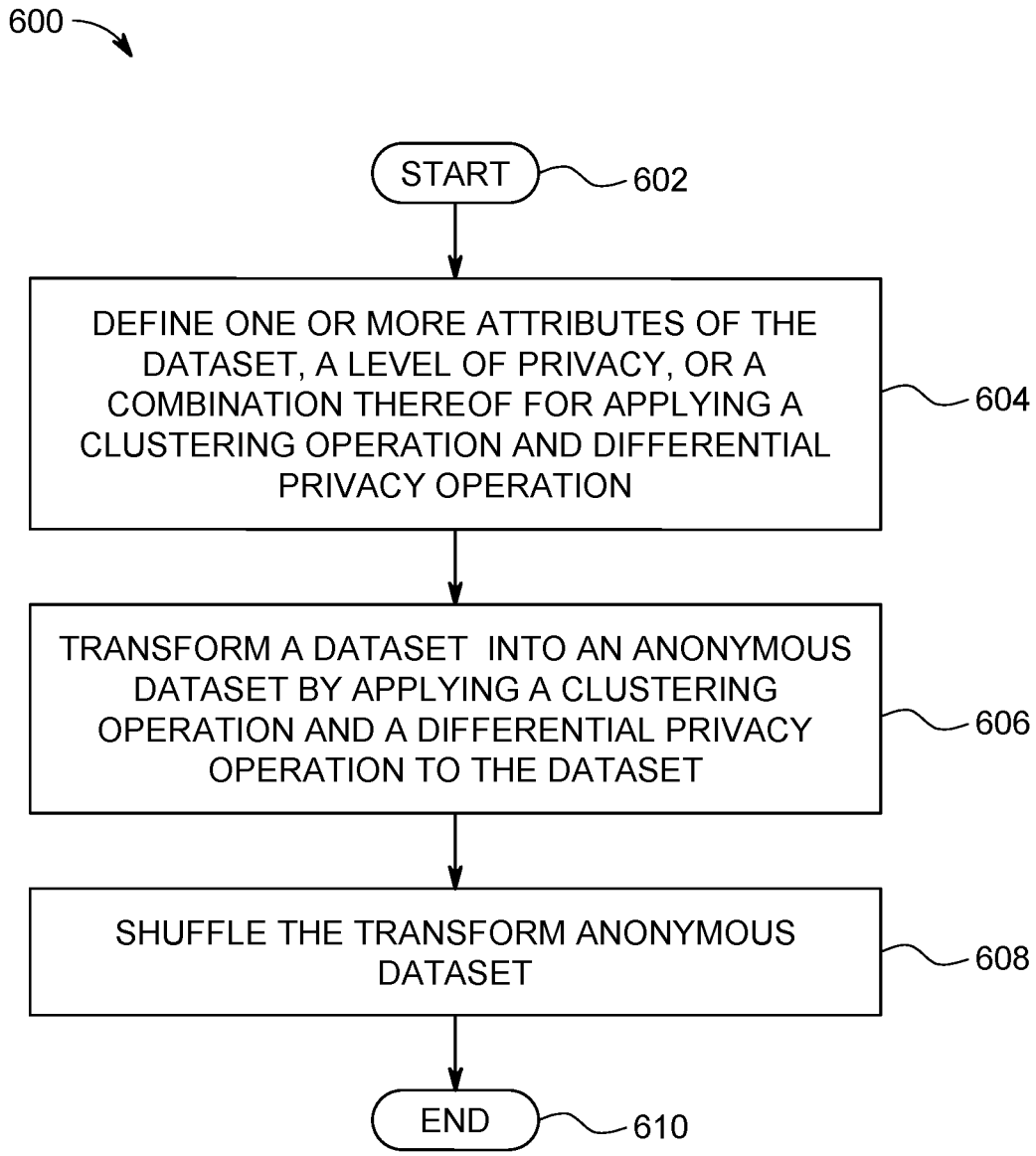
FIG. 6 is an additional flowchart diagram depicting an additional exemplary method for applying differential privacy on clustered data, again in which various aspects of the present invention may be realized.

Turning now to FIG. 6, a flowchart showing an additional exemplary method 600 for enhancing data anonymity by applying differential privacy on clustered data is depicted, here again in which various aspects of the present invention may be realized. In one aspect, each of the devices, components, modules, operations, and/or functions described in FIGS. 1-5 also may apply or perform one or more operations or actions of FIG. 6. The functionality 600 may be implemented as a method executed as instructions on a machine, where the instructions are included on at least one non-transitory machine readable storage medium. The functionality 600 may start in block 602. One or more attributes of the dataset, a level of privacy, or a combination thereof may be defined for applying the clustering operation and differential privacy operation, as in block 604. A dataset may be transformed into an anonymous dataset by applying a differential privacy operation and a clustering operation to the dataset, as in block 606. The transformed dataset may be shuffled (e.g., reorganized in a database), as in block 608. The functionality 600 may end, as in block 610.

Figure 7:
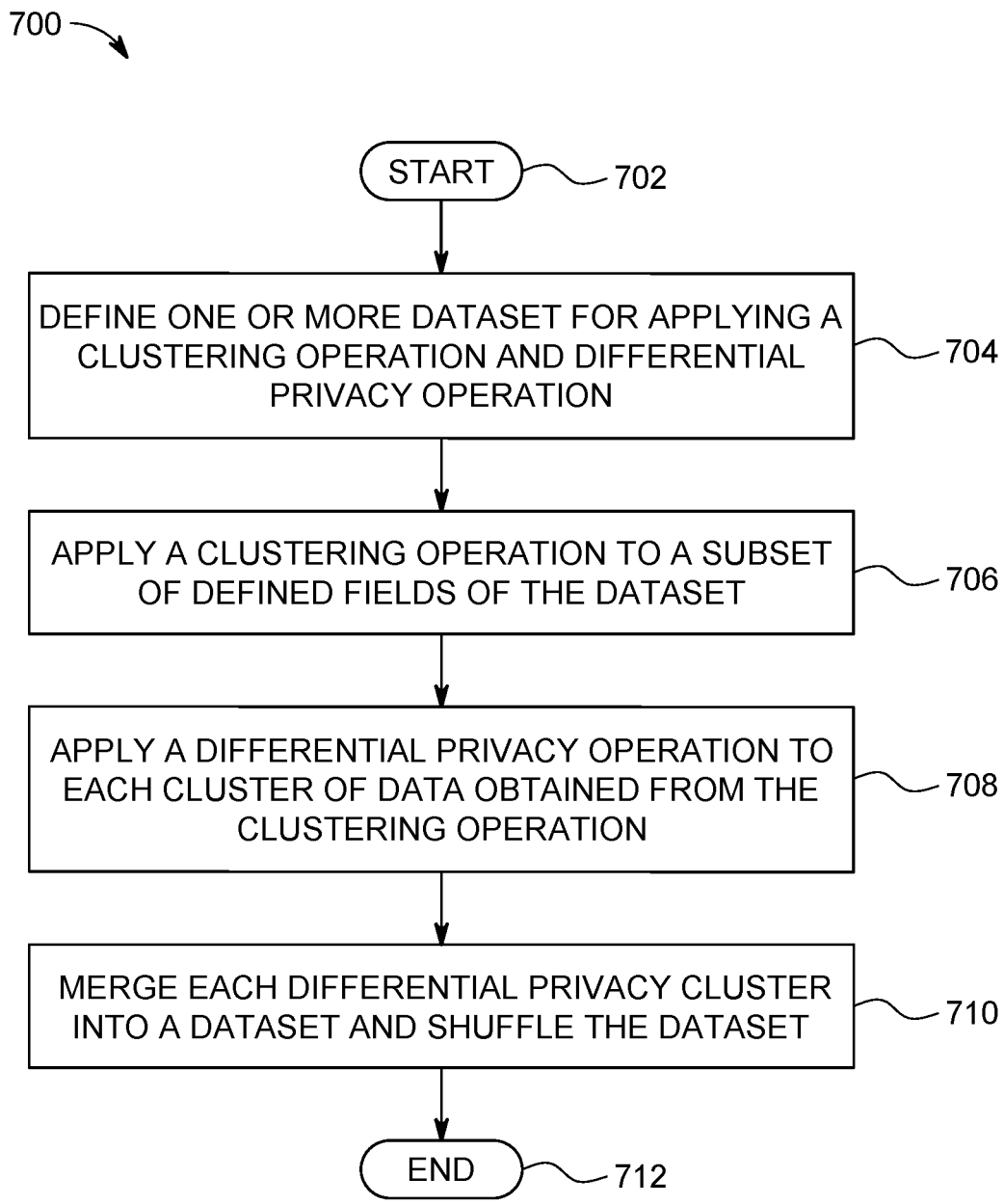
FIG. 7 is an additional flowchart diagram depicting an additional exemplary method for applying differential privacy on clustered data, again in which various aspects of the present invention may be realized.

Turning now to FIG. 7, a flowchart showing an additional exemplary method 700 for enhancing data anonymity by applying differential privacy on clustered data is depicted, here again in which various aspects of the present invention may be realized. In one aspect, each of the devices, components, modules, operations, and/or functions described in FIGS. 1-5 also may apply or perform one or more operations or actions of FIG. 7. The functionality 700 may be implemented as a method executed as instructions on a machine, where the instructions are included on at least one non-transitory machine readable storage medium. The functionality 700 may start in block 702. One or more datasets may be defined for applying the clustering operation and differential privacy operation, as in block 704. A clustering operation may be applied to a subset of defined fields of the dataset, as in block 706. A differential privacy operation may be applied to each cluster of data obtained from the clustering operation, as in block 708. Merge each differential privacy cluster into a dataset and shuffle the dataset, as in block 710. The functionality 700 may end, as in block 712.

In one aspect, in conjunction with and/or as part of at least one block of FIGS. 6-7, the operations of methods 600 and 700 may include each of the following. The operations of method 700 may include applying the differential privacy operation and the clustering operation to one or more fields of the dataset. The clustering operation may also be applied to a subset of defined fields of the dataset. One or more subsets of defined fields of the dataset may be partitioned. The differential privacy operation may be performed or executed in parallel with or subsequent to the clustering operation. The differential privacy operation may also be applied to each cluster of data obtained from the clustering operation. More specifically, the clustering operation may be applied first to a subset of fields of the dataset. Subsequently, the differential privacy operation is applied to an alternative subset of fields of the dataset.

Thus, the mechanisms of the illustrated embodiments provide flexibility in a level of privacy applied to a dataset. Global utility of the anonymized dataset is improved as compared to performing only a k-anonymity operation. Furthermore, the illustrated embodiments increase privacy guarantees as compared to data perturbation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for data anonymity in a computing environment by a processor, comprising:

receiving a dataset by the processor, the dataset comprising records stored in a database; wherein the records include a plurality of defined fields, some of the plurality of defined fields including at least categorical and numerical attributes;

defining, through a user interface, a first algorithm for a differential privacy operation and a second algorithm for a clustering operation to be performed on the dataset;

transforming the dataset by the processor into an anonymous dataset by applying the differential privacy operation and the clustering operation to the dataset; wherein the differential privacy operation is applied to each cluster of data obtained from the clustering operation such that the clustering operation is applied to a first subset of the plurality of defined fields of the records and the differential privacy operation is applied to a second, remaining subset of the plurality of defined fields of the records; and wherein, responsive to a completion of both the clustering operation and the differential privacy operation, the records of the dataset are shuffled as reorganized in the database; and outputting and storing, by the processor, the transformed dataset as the anonymous dataset having a specified level of privacy according to the differential privacy operation such that k-anonymity is achieved on the plurality of defined fields including both the categorical and numerical attributes of the dataset transformed by the differential privacy operation into the anonymous dataset.

2. The method of claim 1, further including partitioning one or more subsets of defined fields of the dataset.

3. The method of claim 1, further including executing the differential privacy operation in parallel with or subsequent to the clustering operation.

4. The method of claim 1, further including defining one or more attributes of the dataset, the specified level of privacy, or a combination thereof for applying the clustering operation and differential privacy operation.

5. A system for data anonymity in a computing environment, comprising:

one or more computers with executable instructions that when executed cause the system to:

receive a dataset by the processor, the dataset comprising records stored in a database; wherein the records include a plurality of defined fields, some of the plurality of defined fields including at least categorical and numerical attributes;

define, through a user interface, a first algorithm for a differential privacy operation and a second algorithm for a clustering operation to be performed on the dataset;

transform the dataset by the processor into an anonymous dataset by applying the differential privacy operation and the clustering operation to the dataset; wherein the differential privacy operation is applied to each cluster of data obtained from the clustering operation such that the clustering operation is applied to a first subset of the plurality of defined fields of the records and the differential privacy operation is applied to a second, remaining subset of the plurality of defined fields of the records; and wherein, responsive to a completion of both the clustering operation and the differential privacy operation, the records of the dataset are shuffled as reorganized in the database; and output and store, by the processor, the transformed dataset as the anonymous dataset having a specified level of privacy according to the differential privacy operation such that k-anonymity is achieved on the plurality of defined fields including both the categorical and numerical attributes of the dataset transformed by the differential privacy operation into the anonymous dataset.

6. The system of claim 5, wherein the executable instructions further partition one or more subsets of defined fields of the dataset.

7. The system of claim 5, wherein the executable instructions further execute the differential privacy operation in parallel with or subsequent to the clustering operation.

8. The system of claim 5, wherein the executable instructions further define one or more attributes of the dataset, the specified level of privacy, or a combination thereof for applying the clustering operation and differential privacy operation.

9. A computer program product for, by a processor, data anonymity within a computing environment, the computer program product comprising a non-transitory computer-readable storage medium having computer-readable program code portions stored therein, the computer-readable program code portions comprising:

an executable portion that receives a dataset by the processor, the dataset comprising records stored in a database; wherein the records include a plurality of defined fields, some of the plurality of defined fields including at least categorical and numerical attributes;

an executable portion that defines, through a user interface, a first algorithm for a differential privacy operation and a second algorithm for a clustering operation to be performed on the dataset;

an executable portion that transforms the dataset by the processor into an anonymous dataset by applying the differential privacy operation and the clustering operation to the dataset; wherein the differential privacy operation is applied to each cluster of data obtained from the clustering operation such that the clustering operation is applied to a first subset of the plurality of defined fields of the records and the differential privacy operation is applied to a second, remaining subset of the plurality of defined fields of the records; and wherein, responsive to a completion of both the clustering operation and the differential privacy operation, the records of the dataset are shuffled as reorganized in the database; and an executable portion that outputs and stores, by the processor, the transformed dataset as the anonymous dataset having a specified level of privacy according to the differential privacy operation such that k-anonymity is achieved on the plurality of defined fields including both the categorical and numerical attributes of the dataset transformed by the differential privacy operation into the anonymous dataset.

10. The computer program product of claim 9, further including an executable portion that partitions one or more subsets of defined fields of the dataset.

11. The computer program product of claim 9, further including an executable portion that executes the differential privacy operation in parallel with or subsequent to the clustering operation.

12. The computer program product of claim 9, further including an executable portion that defines one or more attributes of the dataset, the specified level of privacy, or a combination thereof for applying the clustering operation and differential privacy operation.

* * * * *